United States Patent [19]

Agui et al.

[11] Patent Number: 4,883,596
[45] Date of Patent: Nov. 28, 1989

[54] CARBONACEOUS ADSORBENT FOR REMOVAL OF PYROGEN AND METHOD OF PRODUCING PURE WATER USING SAME

[75] Inventors: Wataru Agui, Tokyo; Shuji Tamura, Ohmiya; Hiroshi Kuyama, Urawa; Yoshiya Kurachi, Tokyo; Masahiko Abe, Noda; Yukihiro Kaneko, Funabashi; Keizo Ogino, Tokyo, all of Japan

[73] Assignee: Tokyo Organic Chemical Industries, Ltd., Tokyo, Japan

[21] Appl. No.: 167,239

[22] Filed: Mar. 11, 1988

[30] Foreign Application Priority Data

Mar. 31, 1987 [JP] Japan ................................ 62-76093
Mar. 31, 1987 [JP] Japan ................................ 62-76094

[51] Int. Cl.$^4$ ............................ C02F 1/28; C02F 9/00
[52] U.S. Cl. ..................................... 210/638; 210/668; 210/692; 210/900
[58] Field of Search ........ 210/694, 900, 638, 650–654, 210/663, 668, 669, 686, 691, 692; 502/423, 430

[56] References Cited

U.S. PATENT DOCUMENTS

| | | | |
|---|---|---|---|
| 3,950,267 | 4/1976 | Arakawa et al. | 502/423 |
| 4,059,512 | 11/1977 | Harris | 210/692 |
| 4,064,043 | 12/1977 | Kollman | 210/692 |
| 4,548,716 | 10/1985 | Boeve | 210/900 |

OTHER PUBLICATIONS

Abstracts of Lecture (I) of the Forty-fourth Spring National Meeting of the Chemical Society of Japan, 1987, p. 525, (Translation in red).

Primary Examiner—Ivars Cintins
Attorney, Agent, or Firm—Oblon, Spivak, McClelland, Maier & Neustadt

[57] ABSTRACT

A carbonaceous absorbent to be used for the removal of a pyrogen dissolved in water is disclosed. The absorbent is obtained by carbonizing porous beads of a cross-linked polymer. This absorbent is favorably used for the removal of endotoxin in the production of pure water from deionized water resulting from the treatment with iron-exchange resins.

6 Claims, 1 Drawing Sheet

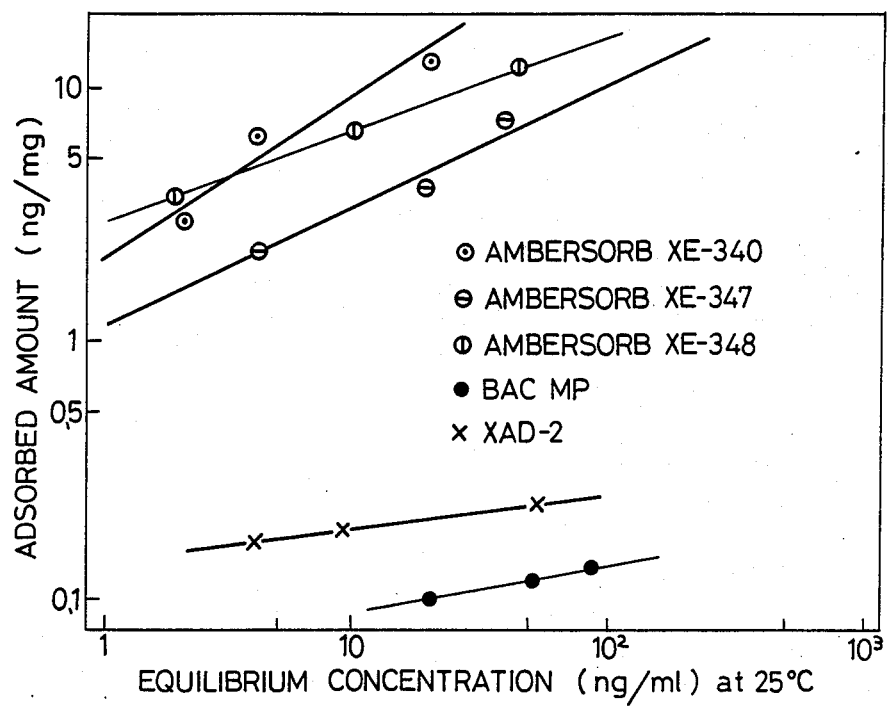

CARBONACEOUS ADSORBENT FOR REMOVAL OF PYROGEN AND METHOD OF PRODUCING PURE WATER USING SAME

BACKGROUND OF THE INVENTION:

a. Field of the Invention:

This invention relates to a carbonaceous adsorbent to be used for the removal of a pyrogen dissolved in water. It also relates to a method for the removal of endotoxin with the carbonaceous adsorbent in the production of pure water from deionized water resulting from the treatment with ion-exchange resins.

b. Description of the Prior Art:

The "pyrogen" is the generic term applied to all substances which, even in an extremely small amount, cause abnormal elevation of body temperatures of homothermal animals. If a pyrogen finds its way into the blood in a human body as by intravenous injection of a medicine, it causes a violent exothermic reaction independently of the principal action of the medicine. In an extreme case, this exothermic reaction could result in fatal shock.

The pyrogenic toxin consists mainly of the bacterial endotoxin which is a compound lipopolysaccharide occurring as the cell membrane component of gram negative bacteria. The pharmacopoeia in numerous countries prohibit solutions for injection from containing pyrogens as well as microorganisms. The integration of semiconductor elements has advanced to a point where the so-called superpure water obtained by enhancing the purity of normally pure water ultimately to suit production of such semiconductor elements is now required to meet the exacting standard that the number of live microorganisms, the source of pyrogen, should not exceed 0.02/ml.

Production of pure water containing no pyrogen is generally effected by following the operation of distillation defined by the Pharmacopoeia for the purification of water. The pure water obtained by just one round of the distillation, more often than not, gives a positive result in the Limulus test (the test resorting to the gelling reaction of the limulus amberbocyte lysate with endotoxin).

Heretofore, as means of removing pyrogenic substances, the treatment using powdered granulated activated carbon and the treatment using a varying species of ion-exchange resin have been tried. These treatments, however, often experience leaks of liquids under treatment owing to variation of load of pyrogenic substance and cannot be expected to give a stable effect. Thus, as disclosed in Japanese Patent No. 989,058 titled "Method for obtaining refined sugar solution containing no pyrogenic substance" and Japanese Patent No. 738,632 titled "Method for obtaining aqueous solution for injection containing neither pyrogen nor microorganism by treatment of filtration", for example, the membrane separation method using a filtration membrane has come to find widespread acceptance.

Generally, the membrane separation method, instead of being independently used, is incorporated as one element in the extremely expensive system for the production of superpure water. To be specific, this is a method which comprises passing town water containing various ions and organic substances as well as pyrogens in large amounts through activated carbon and/or ion-exchange resin, storing the treated water, and forwarding the water for further treatments through an ultraviolet light sterilizer, a regeneration type mixed-bed type ion-exchange resin column, and a filtration membrane such as an ultrafiltration membrane or a reverse-osmosis membrane. Microorganisms by nature possess a multiplying property. The microorganisms in the water under treatment, even after sterilization of the water, are captured within the system, particularly on the surface of a filtration membrane. In consequence of the growth of the number of killed microorganisms, the concentration of endotoxin continues to increase possibly to the extent of inducing early clogging of the membrane and constituting one factor for the unexpected impairment of the membrane quality.

It is known that once the pyrogen-free water obtained as described above is released from the germ-free condition, it is highly susceptible to micro-organic contamination and is liable to suffer quick formation of endotoxin. In the circumstances, the desirability of developing a medicine, a special adsorbent, or other similar means capable of easily and effectively producing pyrogen-free water has been finding enthusiastic recognition. Various attempts are being made in search of a method capable of effectively removing pyrogens from water by adsorption. In the case of ion-exchange resin, synthetic adsorbent, and various species of activated carbon, for example, porous ion-exchange resins (produced by Rohm and Haas Co. and marketed under registered trademark designations of "Amberlite" 200 and IRA-938) have been demonstrated to produce some effect and synthetic adsorbents such as, for example, Amberlite XAD, and activated carbons have been reported as effective, if not perfectly, in the Journal of Chemical Society of Japan, No. 8, pp. 1547-1553 (1973).

SUMMARY OF THE INVENTION:

An object of this invention is to provide a carbonaceous adsorbent which is capable of adsorbing various pyrogens dissolved in water to decrease the concentration of pyrogens to the level of substantial absence.

Another object of this invention is to provide a method for the removal of endotoxin from water to the level of extremely low concentration.

Further object of this invention is to provide an improved method for the removal of endotoxin which enables production of superpure water or ultra-super-pure water suitable for various applications.

This invention is directed to a carbonaceous adsorbent for the removal of pyrogens obtained by carbonizing porous beads of a cross-linked polymer.

This invention is also directed to a method for the removal of endotoxin in the production of pure water from deionized water resulting from the treatment with ion-exchange resin, which method is characterized in that the removal of endotoxin from the deionized water is effected by the treatment with a carbonaceous adsorbent obtained by carbonizing and optionally further activating porous beads of a cross-linked polymer.

BRIEF DESCRIPTION OF THE DRAWING:

The single drawing is a graph showing the adsorption equilibria of a carbonaceous adsorbent according to the present invention and a conventional adsorbent.

DETAILED DESCRIPTION OF THE INVENTION:

As the polymer for the porous beads contemplated by this invention, generally a copolymer formed of a monovinyl monomer and a polyvinyl monomer is most desirable. This copolymer is produced in the form of porous beads by subjecting the above monomers to a conventional suspension polymerization. The copolymer formed of styrene and divinylbenzene is well-known. Naturally, even with the combination of other monovinyl monomer and other polyvinyl monomer, this invention can be accomplished.

For the beads of copolymer mentioned above to acquire porosity, it is necessary that the monomers should be subjected to the suspension polymerization in the presence of a known additive suitable for impartation of porosity. As typical additives for this purpose, there can be cited solvents of a type soluble in monomers called "precipitants" and incapable of swelling the produced copolymer, solvents of a type soluble in monomers called "swelling agents" and capable of swelling the produced copolymer, mixed solvents simultaneously containing the aforementioned swelling agents and precipitants, organic liquids of a type formed of such swelling agents and monovinyl linear polymers capable of forming a homogeneous liquid phase with the swelling agents, and insoluble macromolecules such as polyalkylene glycols which are soluble in the monomer mixtures and inactive to the produced copolymer. The additives are not limited to those cited above. Any of the other known agents capable of producing porous copolymers can be naturally adopted.

The porous cross-linked copolymer produced by the method described above, when necessary, may be sulfonated or chloromethylated and then aminated into an ion-exchange resin. This ion-exchange resin is as desirable for the purpose of this invention as the aforementioned porous copolymer.

The porous beads of a cross-linked copolymer may be a commercially available product. For example, they may be ion-exchange resins of the aforementioned Amberlite series or various synthetic adsorbents. Besides, various commercially available products such as Diaion (registered trademark owned by Mitsubishi Chemical Industries Ltd.) and Dowex (registered trademark owned by The Dow Chemical Company) are naturally usable herein.

The desired adsorbent is formed by subjecting the porous beads of cross-linked copolymer obtained as described above to a carbonizing treatment by the conventional method. Examples of the conventional method usable for the carbonization include those disclosed in the specifications of Japanese Patent Laid-open Nos. 53,594/74, 50,088/78, 126,390/76, 30,799/77 and 63,691/76. The desired carbonaceous adsorbent is obtained by infusibilizing porous beads of a cross-linked polymer as with sulfuric acid, nitrogen dioxide, or chlorine and thermally decomposing the infusibilized porous beads at a temperature in the range of 300° C. to 900° C. The adsorbent obtained as described above may be used in its unmodified form. It may be put to use, when necessary, after it has been thoroughly activated as with steam or an aqueous zinc chloride solution.

As a commercial product obtained by the method described above, Ambersorb (registered trademark owned by Rohm and Haas Co.) is available in the market. It can be used in working the present invention. This adsorbent is in the form of beads, has a low ash content, and is characterized by excelling in wear resistance and physical strength. Besides radical differences in physical properties, the salient difference between the adsorbent and commercially available powdered or granulated activated carbon resides in the fact that the porous beads of the cross-linked polymer retain the skeletal structure thereof intact through the treatments of carbonization and activation. This salient difference is believed to contribute to the wide difference in the capacity for adsorption of pyrogens.

The adsorbent of this invention is used in the treatment of water for medical applications such as, for example, water for use in artificial internal organs, water for injection, water for surgical operations, water for the preparation of solutions supplied in ampoules, water for the preparation of Ringer's solution, and water for the preparation of physiological saline water, water for pharmaceutical products, and water for the production of semiconductor elements. For example, it is used in the system for production of superpure water by treating normally pure water to the ultimate purity, i.e. the level of substantial absence of pyrogens.

The absorbent, for example, Amberlite XE series produced by Rohm and Haas Co., is in the form of beads, has a low ash content, and is characterized by excelling in wear resistance and physical strength. These secondary characteristics have special significances in the treatment of endotoxin in pure water.

Owing to these characteristics in addition to the capacity for effective adsorption of endotoxin, the use of the adsorbent permits the desired removal of endotoxin in pure water without impairing the quality of the water under treatment.

The conventional activated carbon for the treatment of water had the disadvantage that it constitutes a warm nursery for the growth of bacteria because of its amorphousness, succumbs to disintegration because of its deficiency in physical strength and wear resistance, persists in the form of finely divided particles within the system of treatment, and consequently impairs the quality of the water under treatment. Besides radical differences in physical properties, the salient difference between the adsorbent and commercially available powdered or granulated activated carbon resides in the fact that the porous beads of the cross-linked polymer retain the skeletal structure thereof intact through the treatments of carbonization and activation. This salient difference is believed to contribute to the wide difference in the capacity for adsorption of endotoxin.

The desired treatment of the deionized water with the present carbonaceous adsorbent can be accomplished by a method which comprises passing the deionized water through a column of a proper size packed with the adsorbent.

The incorporation of the method of this invention in the simplified system for the production of pure water is accomplished by treating with the aforementioned carbonaceous adsorbent the deionized water resulting from the treatment with an ion-exchange resin or the deionized water resulting from the treatment with activated carbon plus the treatment with an ion-exchange resin.

The superpure water for medical use such as the water used for the preparation of solutions for injection containing no pyrogenic substance and the ultra-superpure water necessary for the production of semiconductor elements of increasingly high integration are required to fulfil the exacting standard that the number of live microorganisms, the source of pyrogen, should not exceed 0.02/ml. In the production of such superpure water or ultra-superpure water, live microorganisms are killed by the ultraviolet light. Since the endotoxin is released from the killed microorganisms into the water, the treatment for the removal of endotoxin contemplated by the present invention is desired to be carried out after the treatment with the ultraviolet light and before the treatment with a regeneration type mixed-bed ion-exchange resin column or to be carried out before the treatment with a filtration membrane at the final step of the entire process.

To be more specific, in the production of superpure water or ultra-superpure water, the removal of endotoxin contemplated by the present invention can be effectively performed at a desired point between a water storage tank and a filtration membrane in a whole series of treatments using an ion-exchange resin column, the water storage tank, an ultraviolet light sterilizer, a regeneration type mixed-bed ion-exchange resin column, and a filtration membrane such as an ultrafiltration membrane or a reverse-osmosis membrane.

Compared with the conventional activated carbon adsorbent, the carbonaceous adsorbent of this invention can be used very simply and effectively for the production of water containing substantially no pyrogens. Moreover, the present carbonaceous adsorbent enables easily to produce pure (superpure or ultra-superpure) water containing substantially no endotoxin in a large amount.

The present invention will be described specifically below with reference to working examples.

EXAMPLE 1:

In 1.5 liters of distilled water, 5.0 g of polyvinyl alcohol, 2 g carboxymethyl cellulose, and 56 g of NaCl were dissolved. To the resultant solution, a mixture consisting of 200 g of styrene, 132 g of divinylbenzene (commercial product 59%), 240 g of butanol, and 1.5 g of benzoyl peroxide was added and reacted under stirring at 85° C. for six hours. In 500 g of 15% fuming sulfuric acid, 40 g of the porous beads of the cross-linked polymer obtained were sulfonated at 110° C. for six hours. Then they were washed first with $H_2SO_4$ and then with water and dried. Subsequently, in $N_2$, the sulfonated porous beads of the polymer were calcined at a temperature increasing rate of 300° C./hr up to 950° C. The resultant calcined porous beads had an apparent specific gravity of 0.5 and a pore volume of 0.6 g/cc. The porous beads of carbon were activated in an atmosphere of steam at 800° C. for two hours. Consequently, there was obtained a carbonaceous adsorbent having a surface area of 1,100 $m^2/g$.

EXAMPLE 2:

In 1.5 liters of distilled water, 5 g of polyvinyl alcohol, 2.5 g of carboxymethyl cellulose, and 56 g of NaCl were dissolved. To the resultant solution, a mixture consisting of 200 g of styrene, 132 g of divinylbenzene (commercial product, 59%), 240 g of toluene, and 1.5 g of benzoyl peroxide was added and reacted under stirring at 85° C. for six hours. In 500 g of 15% fuming sulfuric acid, 40 g of the porous beads of polymer consequently obtained was sulfonated at 110° C. for six hours, washed first with sulfuric acid and then with water, and dried. Then, in an atmosphere of $N_2$, the porous beads of polymer were calcined at a temperature increasing rate of 300° C./hr up to 950° C. They had an apparent specific gravity of 0.55 and a pore volume of 0.6 cc/g. The porous beads of carbon were activated in an atmosphere of steam at 800° C. for two hours. Consequently, there was obtained a carbonaceous adsorbent having a surface area of 1,020 $m^2/g$.

EXAMPLE 3:

The pyrogens contained in the town water stored in a feed tank installed on the roof of a five-storey building were tested for equilibrium concentration with respect to a carbonaceous adsorbents, Ambersorb XE-340, 347, and 348 and activated carbon beads (oil pitch) produced by Kureha Chemical Industry Co., Ltd. For comparison, the same pyrogens were tested for equilibrium concentration with respect to uncarbonized porous beads of cross-linked polymer adsorbent, XAD-2. The results were as shown in the accompanying drawing. It is noted from the data that the aforementioned carbonaceous adsorbent showed a large capacity for adsorption in a liquid containing various salts and organic carbons of high concentrations as compared with the activated carbon. The pyrogen concentration was determined with a toxinometer made by Wako Junyaku K. K., using limulus amerbocyte lysate also made by the same company. The analyses of the adsorbents used and those of the water used were shown below.

| | Ambersorb | | | Kureha BAC | |
|---|---|---|---|---|---|
| | XE-340 | −347 | −348 | MP | XAD-2 |
| Surface area ($m^2/g$) | 374 | 345 | 500 | 1160 | 300 |
| Pore volume ($m^3/g$) | 0.346 | 0.425 | 0.580 | 0.633 | 0.64 |
| Bulk density ($g/cm^3$) | 0.6 | 0.7 | 0.6 | 0.6 | — |
| Particle diameter (mm) | 0.84~0.30 | 0.84~0.30 | 0.84~0.30 | 0.59~0.25 | 0.25~0.85 |
| Ash content (%) | 0.2 | 0.16 | 0.02 | 0.01 | — |

| Analyses of town water | | | |
|---|---|---|---|
| Total organic carbon | 1.5 mg/l | Calcium | 16 mg/l |
| Electroconductivity | 260 MS/cm | Sodium | 24 mg/l |
| Free chlorine | 0.2 mg/l | | |
| Chlorine ion | 41 mg/l | Number of live microorganims | 0/100 ml |
| Sulfate ion | 33 mg/l | | |
| Silica | 14 mg/l | | |

EXAMPLE 4:

A town water containing pyrogens in a concentration of 80 ng/ml was used as raw water. It was distilled once in a distillation kettle made of copper. Then, it was distilled in a distillation kettle made of Pyrex glass to produce distilled water having an electroconductivity of 1.2 M $\Omega$/cm. The distilled water emanating from the distillation kettle was received in a polyethylene container having an inner volume of 20 liters and provided with a carbon dioxide absorption tube and left standing for two days (during which period, about 2 liters of the water was taken via a faucet disposed in the lower part of the container). During this standing, the distilled water was microorganically contaminated (150 live microorganisms/100 ml). In the water, the presence of pyrogens at a concentration of 1 ng/ml was detected.

When this water was passed through glass columns measuring 10 cm in inside diameter and 30 cm in height and severally containing 10 g each of Ambersorb XE-347, the carbonaceous adsorbent of Example 1 obtained by carbonizing and activating the macroporous synthetic polymer indicated below, and a commercially available Pittsburgh granular activated carbon at a space velocity (SV) of 4 (a liquid speed twice the amount of adsorbent per hour). The amounts of water treated until the pyrogen detection limit, 0.01 ng/ml, were shown below.

|  | Ambersorb XE-347 | Adsorbent of Example 1 | Pittsburg granular activated carbon |
| --- | --- | --- | --- |
| Amount treated (lit) 25° C. | 20 | 18 | 4.2 |
| Amount treated (lit) 40° C. | 17 | 15 | 3.0 |

EXAMPLE 5:

When 50 liters of physiological saline water containing 0.9 g of sodium chloride per 100 cc of the sterilized water conforming with the standard of Japanese Pharmacopoeia were prepared, it was found to have been contaminated with pyrogens to a level of 0.15 ng/ml. Two halves of this saline water were passed through glass columns 3 cm in inside diameter severally packed with 250 ml of Pittsburg coconut sheel activated carbon and 250 ml of Ambersorb XE-348 at a space velocity (SV) of 20. In the physiological saline water passed through the Ambersorb XE-348, the pyrogen concentration was found to be below 0.01 ng/ml. In the physiological saline water treated with the activated carbon, the pyrogen concentration was 0.03 ng/ml.

EXAMPLE 6:

To recover various proteins and nucleic acids from colon bacillus (*E. Coli*: IAM 1268) cell extract, the cell extract was each 2.5 ml (PH 5.6) in volume two glass columns 3 cm in diameter packed severally with 100 ml of Ambersorb XE-340 and 100 ml of Tsurumi Soda (Ltd.) granular activated carbon HC-30. Then, the water for injection produced by Otsuka Pharmaceutical was passed through the glass columns at a space velocity (SV) of 1 at room temperature to effect removal of endotoxin. Consequently, there were obtained eluates each 200 ml in volume. The endotoxin concentrations in these eluates were as follows:

|  | Endotoxin concentration |
| --- | --- |
| Raw liquid | $4 \times 10^5$ (ng/2.5 ml of cell extract) |
| Eluate from Ambersorb XE-340 | <0.01 (mg/ml) |
| Eluate from Tsurumi Soda granular activated carbon | 0.5 (mg/ml) |

EXAMPLE 7:

A system intended for the production of deionized water from town water as the raw material and composed of a column of granular activated carbon, a column of gel type cation-exchange resin, a column of gel type anion-exchange resin, and a column of mixed-bed type ion-exchange resin in the form of porous beads of cross-linked polymer was intermittently operated by feeding about 100 liters of the town water over a duration of about four hours per cycle. After this operation was continued for about two weeks, the endotoxin began to leak in the deionized water at an average level of 1.5 ng/ml.

Then, the gel type cation- and anion-exchange resins were regenerated by the conventional method. After this regeneration, the passage of the town water through the system was started again. In this operation, the endotoxin began to leak in the deionized water at a higher level than before on the second day of the operation.

When the entire system was searched in an effort to find the cause for the leak, the bed of granular activated carbon in the column was found to be acting as a warm pursery for the growth of bacteria. So, the pipe for supply of the town water was replaced with three pipes adapted to pass an equal amount of water. The first pipe was fitted with a column packed with 300 g of Ambersorb XE-347, the second pipe a column packed with 300 g of Pittsburg granular activated carbon produced by Calgon Corp., and the third pipe a column packed with 300 g of Amberlite XAD-2, i.e. uncarbonized porous beads of cross-linked polymer respectively before the supply of the town water was started.

The amounts of the town water treated before the endotoxin detection limit, 0.01 ng/ml, were shown below.

|  | Ambersorb XE-347 | Pittsburg granular activated carbon | XAD-2 |
| --- | --- | --- | --- |
| Amount treated (lit) | 1200 | 540 | 600 |

EXAMPLE 8:

In a small laboratory-grade system intended for the production of pure water from town water as the raw material and adapted to pass the town water through a column of granular activated carbon, a column of gel type cation-exchange resin, a column of anion-exchange resin, and a column of mixed-bed type ion-exchange resin in the form of porous beads of cross-linked polymer, store 200 liters of the treated town water in a feed tank (the section of the deionized water production system on the raw water side was automatically actuated so as to allow the feed tank to keep 200 liters of the water at all times), forward the water from the feed tank through an ultraviolet light sterilizer, a regeneration type mixed-bed ion-exchange resin column, and an ultrafiltration membrane to the point of actual use (faucet), and return the unused water to the feed tank, collection of the treated water was continued (about 100 liters of water of a purity of 18.2 MΩ.cm per day). After one week of this operation, the water was taken as a sample from a sampling point located between the regeneration type mixed-bed ion-exchange resin column and the ultrafiltration membrane and analyzed. The sample was found to contain endotoxin in a concentration of 0.5 ng/ml.

So, a column packed with 500 g of Ambersorb XE-340 was inserted in the system behind the ultraviolet light sterilizer, the endotoxin level within the system was below the detection limit (0.01 ng/ml) even after nine days' passage of the town water. When the same amount of beads of activated carbon, BAC-MP, produced by Kureha Chemical Industry Co., Ltd. were used in the place of Ambersorb XE-340, leakage of endotoxin began to occur on the fourth day of the passage of the town water.

EXAMPLE 9:

A system intended for the production of deionized water from town water as the raw material and composed of a column of granular activated carbon, a column of gel type cation exchange resin, a column of gel type of anion-exchange resin, and a column of mixed-bed type ion-exchange resin in the form of porous beads of crosslinked copolymer was intermittently operated by feeding about 100 liters of the town water over a duration of about two hours, the endotoxin began to leak in the deionized water at an average level of 1.5 ng/ml.

Then, the pipe for supply of the town water was replaced with three pipes adopted to pass an equal amount of water. The first pipe was fitted with a column packed with 100 g of Ambersorb XE-347, the second pipe a column packed with a mixture of 50 g of a carbonaceous adsorbent made by carbonizing a synthetic adsorbent and 50 g of a carbonaceous adsorbent made by carbonizing and activating a synthetic adsorbent and the third pipe a column packed with 100 g of an uncarbonized porous synthetic polymer for comparison, respectively before the supply of the town water was started.

The amounts of the town water treated before the endotoxin detection limit, 0.01 ng/ml, was shown as below.

| (1) Ambersorb XE-347 | 1250 l |
|---|---|
| (2) Carbonaceous Adsorbent (carbonized adsorbent + carbonized and activated adsorbent) | 1180 l |
| (3) Porous synthetic polymer | 580 l |

The preparation method of the carbonaceous adsorbent is shown below.

The porous synthetic polymer (3) was obtained by dissolving 5.0 g of polyvinylalcohol, 2 g of carboxymethyl cellulose and 56 g of NaCl in 1.5 l of distilled water, adding a mixture of 200 g of styrene, 132 g of divinylbenzene (purity: 59%), 240 g of butanol, and 1.5 g of benzoyl peroxide, and reacting the resultant mixture for 6 hours at 85° C. under stirring.

Then, 250 g of the porous crosslinked polymer was sulfonated in 3100 g of fuming sulfuric acid for 6 hours at 110° C. The polymer was washed with water after washed with sulfuric acid, and then was dried. The carbonaceous adsorbent (2), 0.5 g/cc of density, and 0.6 g/cc of pore volume, was obtained by carbonizing the sulfonated polymer until 950° C. at 300° C./hour in a rise in temperature in $N_2$ gas. A part of the carbonaceous adsorbent produced was activated with steam for 2 hours at 800° C. The adsorbent activated had 1100 $m^2/g$ of the surface area.

What is claimed is:

1. A method for the removal of pyrogenic matter dissolved in water, comprising:
   contacting the water containing pyrogenic matter with a carbonaceous adsorbent prepared by carbonizing porous beads of a cross-linked polymer, wherein the cross-linked porous beads retain their skeletal structure intact through the carbonization treatment.

2. A method for the removal of endotoxins from water which has been deionized by treatment with an ion exchange resin, which comprises:
   contacting the deionized water containing endotoxins with a carbonaceous adsorbent prepared by carbonizing porous beads of a cross-linked polymer, wherein the carbonizing treatment allows the skeletal structure of the cross-linked polymer to remain intact.

3. The method as claimed in claim 2 wherein the adsorbent is activated with steam or an aqueous zinc chloride solution.

4. The method as claimed in claim 2 wherein the adsorbent is obtained by carbonizing porous beads of a cross-linked copolymer of styrene and divinylbenzene or by carbonizing these porous beads and then activating the resulting carbonization product.

5. The method as claimed in claim 2, wherein the porous beads are infusibilized before they are carbonized.

6. In a process for producing super pure water or ultra-super pure water by passing water containing a pyrogenic substance through a series of steps of ion-exchange, water storage, sterilization with ultraviolet light, ion exchange with a regeneration type mixed-bed ion exchange resin, filtration with an ultrafiltration membrane or a reverse-osmosis membrane, the improvement comprising:
   after storage of the water, but prior to filtration, contacting the water containing a pyrogenic substance with a carbonaceous adsorbent prepared by carbonizing porous beads of a cross-linked polymer, wherein the carbonizing treatment allows the skeletal structure of the cross-linked polymer to remain intact.

* * * * *